Oct. 10, 1933.  J. B. STRAUSS  1,929,858
AIR SPRING OPERATING MEANS
Filed April 2, 1932   2 Sheets-Sheet 1
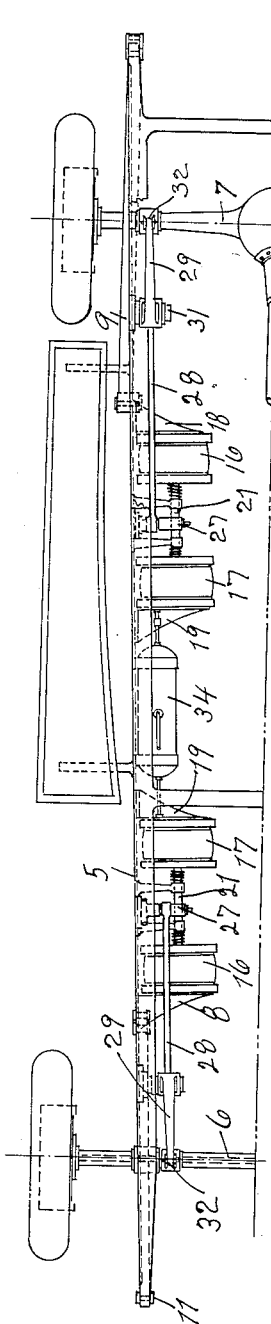
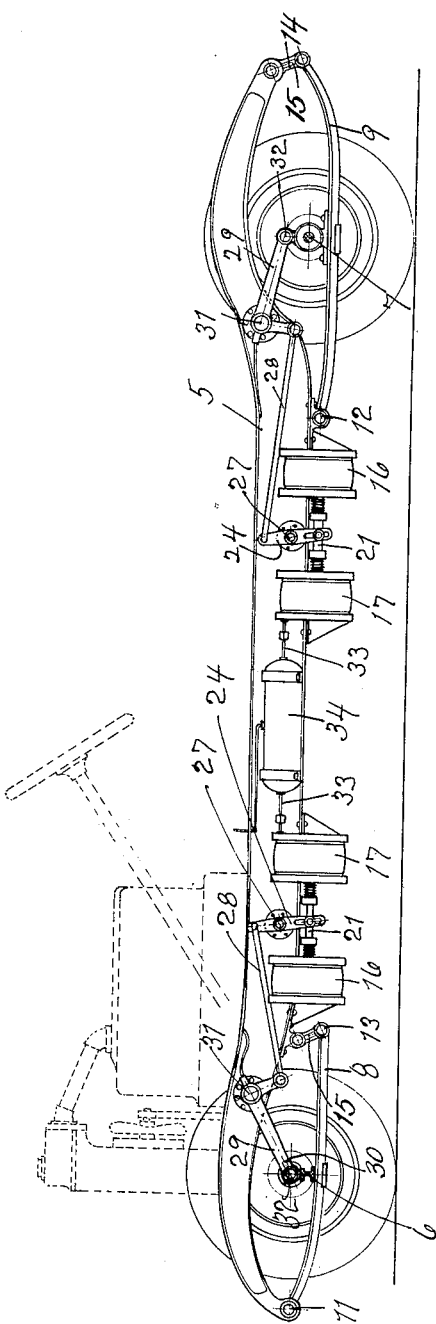
INVENTOR.
JOSEPH B. STRAUSS
BY
ATTORNEY Oct. 10, 1933.    J. B. STRAUSS    1,929,858
AIR SPRING OPERATING MEANS
Filed April 2, 1932    2 Sheets-Sheet 2
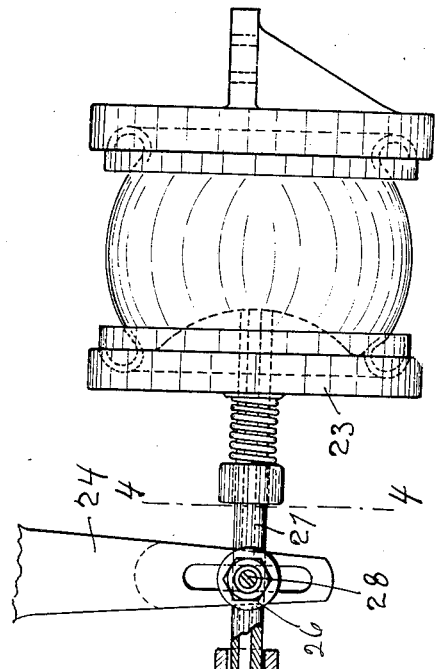
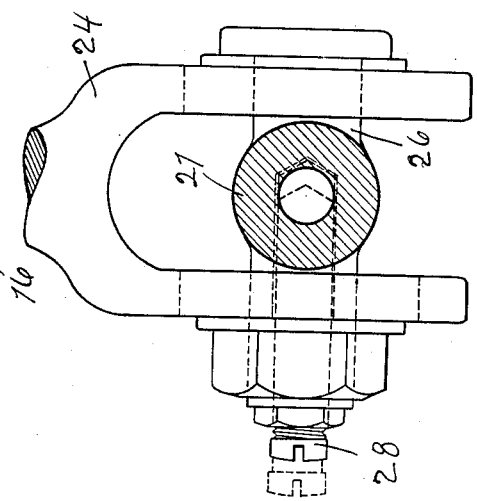
INVENTOR.
JOSEPH B. STRAUSS
BY
ATTORNEY.

Patented Oct. 10, 1933

1,929,858

UNITED STATES PATENT OFFICE 1,929,858

AIR SPRING OPERATING MEANS

Joseph B. Strauss, San Francisco, Calif.

Application April 2, 1932. Serial No. 602,683

8 Claims. (Cl. 280—124)

This invention relates to improvements in air spring mechanism for motor vehicles.

The principal object of this invention is to provide air cushioning means for motor vehicles for the purpose of replacing the ordinary metal springs.

A further object is to provide means whereby side sway will be eliminated.

A further object is to provide means for preventing rebound.

A further object is to produce a device which may be installed upon a modern motor vehicle without materially altering its construction.

A further object is to provide means whereby the pressure in the air chambers may be increased or decreased at the will of the driver.

Other objects and advantages will be apparent during the course of the following description.

In the accompanying drawings forming a part of this specification and in which like numerals are employed to designate like parts throughout the same, Figure 1 is a vertical cross-section of a motor vehicle chassis having my invention applied thereto, Figure 2 is a top plan view of Fig. 1, Figure 3 is an enlarged detail view of the air sack elements, one of which is shown in cross-section, Figure 4 is an enlarged detail cross-sectional view taken on the line 4—4 of Fig. 3, and Figure 5 is a side elevation of one of the flexing bars.

It has been common to support the chassis of a motor vehicle thru the medium of leaf metallic springs which depend upon the resiliency of the metal in order to cushion blows encountered as the vehicle travels over the highway, such springs having a rebound action which is objectionable if not controlled, and therefore, shock absorbers have been employed for this purpose. This employment of a shock absorber, while cushioning the rebound, also destroys to a large extent the easy riding qualities of the springs, with a result that of late, large balloon tires have been employed so as to still retain comfortable riding conditions in a motor vehicle.

Applicant has produced a novel cushioning arrangement wherein air under pressure is employed to support the chassis with relation to the axles, and as this air has great elasticity and is a free flowing fluid, it will be evident that a very soft cushioning effect may be experienced.

In the accompanying drawings wherein for the purpose of illustration is shown a preferred embodiment of my invention, the numeral 5 designates a vehicle body adapted to be supported by axles 6 and 7. In this application I have shown flexing bars 8 and 9 hinged to the chassis as at 11 and 12 respectively and having their free ends connected to the chassis by links 13 and 14 respectively which links are slotted at 15 to provide a sliding connection between the links and their respective bars. These flexing bars are of the same construction as shown in my co-pending application No. 576,745, and form no part of this invention. As the structure connected to each of the flexing bars and adapted to receive road shock therefrom is identical, but one will be described. At 16 and 17 I have shown air cells constructed in accordance with my previously referred to application. A bracket 18 supports the air cells 16 and a bracket 19 supports the air cell 17. A pipe 21 extends between the air cells 16 and 17 so as to permit air to flow between the cells. This pipe 21 together with the heads 22 and 23 are reciprocated in unison through the medium of an arm 24, one end of which straddles a trunnion 26. This arm is centrally pivoted as at 27. The trunnion 26 has a valve 28 extending partly there-through and into the bore of the pipe 21 so that the air passage there-through may be restricted if desired. The arm 24 has its opposite end connected thru the medium of a rod 28 to one end of a bell crank lever 29, which bell crank lever is pivoted to the chassis frame 5 as at 31. This bell crank lever is in turn pivoted to a bracket 32 secured to the axle 6. The brackets 32 on the rear axle are rotatably mounted on the axle which accommodates for movement of the bar 9 and lever 29 being pivoted to swing through different arcs. The brackets 32 carried by the front axle are fixed thereto while the lever 29 has a sliding pivotal action which is accomplished through the provision of a slot 30. This arrangement also accommodates for the swing of the two members through different arcs. A pipe 33 extends from one of the cells, as for instance the cell 17 of Fig. 1, to a supply tank 34, which supply tank may be filled from any convenient source of air supply which is always available at any modern service station.

It will be apparent from this construction that as there is one of these devices connected adjacent each wheel, that when the wheel is struck, action will be transmitted thru the flexing bar adjacent that wheel, thence thru the bell crank lever to the rod 28 and to the arm 24, and as this arm is connected to the pipe 21, movement will be transmitted to the air cell 17 on the up stroke of the flexing bar thus compressing the air within the cell 17, at which time a portion of the air will flow thru the pipe 21 and into the cell 16. As the flexing bar moves downwardly away from the chassis, a reversing action will take place, that is, the arm 24 will move the pipe 21 toward the air cell 16, and as a result, air in that cell will be compressed, at which time a portion of the air therein will flow back into the cell 17 thru the pipe. Thus, an equalizing action will take place at all times, and the transmission of road shock from the axles to the chassis will be practically eliminated. Further, thru the arrangement, there will be a cushioning effect in whichever direction the flexing bar tends to move about its pivot 11. Thru this construction, there is independent action for each wheel, thus eliminating a shimmy effect which is usually transmitted from one wheel to the others, and to the frame when metallic springs are used.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, the combination with a vehicle frame having an axle supported there-beneath, a pair of air cells supported on said frame, each of said cells having a movable head, a pipe extending between said cells and connected to said heads whereby air may flow between said cells, an arm pivoted to said frame and engaging said pipe, a rod connected to said arm, a bell crank lever pivoted to said frame, one end of said bell crank lever being pivoted to said axle, the opposite end of said bell crank lever being pivoted to the free end of said rod whereby movement of said axle with relation to said frame will be transmitted to the heads of said air cells in the manner described.

2. In a device of the character described, a vehicle chassis having an axle supported therebeneath, a pair of air cells secured to said chassis, each of said air cells having a movable head, a pipe extending between said air cells and connected to said movable heads, a valve positioned in said pipe whereby the free passage of air between said cells is regulated, an arm pivoted to said frame and engaging a trunnion formed on said pipe, a rod connected to said arm, a bell crank lever pivoted to said frame and to said rod, the free end of said bell crank lever being pivotedly supported to said axle.

3. In a device of the character described, the combination with a vehicle frame having an axle movably supported there-beneath, of a bell crank lever pivoted to said frame and said axle, a rod pivoted to said bell crank lever, an arm pivoted to said frame and to said rod, a pair of air cells positioned on opposite sides of the path of movement of said arm, and means for transmitting motion from the free end of said arm to said air cells simultaneously, said means including a head formed on each of said cells, a pipe extending between said heads, said pipe and having a pivotal connection with said arm.

4. In a device of the character described, the combination with a vehicle frame having an axle movable supported there-beneath, of a bell crank lever pivoted to said frame and to said axle, a rod pivoted to said bell crank lever, an arm pivoted to said frame and to said rod, a pair of air cells positioned on opposite sides of the path of movement of said arm, means for transmitting motion from the free end of said arm to said air cells simultaneously, said means including a head formed on each of said cells, a pipe extending between said heads, said pipe having a pivotal connection with said arm, said pipe having a bore there-thru whereby air may pass between said cells.

5. In a device of the character described, the combination with a vehicle frame having an axle movably supported there-beneath, of a bell crank lever pivoted to said frame and to said axle, a rod pivoted to said bell crank lever, an arm pivoted to said frame and to said rod, a pair of air cells positioned on opposite sides of the path of movement of said arm, means for transmitting motion from the free end of said arm to said air cells simultaneously, said means including a head formed on each of said cells, a pipe extending between said heads, said pipe having a pivotal connection with said arm, said pipe having a bore there-thru whereby air may pass between said cells, and a valve extending into said bore whereby the passage of air thru said bore may be regulated.

6. In a device of the character described, a frame, a support for said frame comprising a rigid bar pivoted to said frame, an axle rigidly secured to said bar, a lever system pivotally connected to said bar, a series of air cells mounted on said frame and connected to said lever system, whereby vertical oscillations of said axle are yieldingly transmitted to said frame thru said air cells.

7. In a device of the character described, the combination of a chassis and an axle supported therebelow, a rigid bar rigidly connected to said axle and pivotally connected to said chassis, a lever system pivotally connected to said bar, a series of air cells mounted on said chassis and connected to said lever system whereby vertical oscillations of the axle are yieldingly transmitted to said chassis through said air cells.

8. In a device of the character described, the combination with a chassis having an axle mounted therebelow, of a support connecting said chassis and said axle and comprising a rigid member connected to said axle at a point between its ends, and pivoted to said chassis at its ends, and a lever system connected to said axle and to the air cells whereby movement of said axle is transmitted to the air cells and yieldingly absorbed thereby.

JOSEPH B. STRAUSS.